US 12,008,687 B2

(12) United States Patent
Zhang et al.

(10) Patent No.: US 12,008,687 B2
(45) Date of Patent: Jun. 11, 2024

(54) ANNULAR STRUCTURE REPRESENTATION

(71) Applicant: Siemens Healthcare GmbH, Erlangen (DE)

(72) Inventors: Yue Zhang, Long Island City, NY (US); Abdoul Amadou, London (GB); Ingmar Voigt, Erlangen (DE); Viorel Mihalef, North Brunswick, NJ (US); Rui Liao, Princeton Junction, NJ (US); Tommaso Mansi, Plainsboro, NJ (US); Matthias John, Erfurt (DE); Bimba Rao, San Jose, CA (US); Helene C. Houle, San Jose, CA (US)

(73) Assignee: Siemens Healthineers AG, Forchheim (DE)

( * ) Notice: Subject to any disclaimer, the term of this patent is extended or adjusted under 35 U.S.C. 154(b) by 550 days.

(21) Appl. No.: 17/174,471

(22) Filed: Feb. 12, 2021

(65) Prior Publication Data

US 2021/0264644 A1   Aug. 26, 2021

Related U.S. Application Data

(60) Provisional application No. 62/979,497, filed on Feb. 21, 2020.

(30) Foreign Application Priority Data

Mar. 27, 2020 (EP) ..................................... 20166104

(51) Int. Cl.
  G06T 11/00 (2006.01)
  G06T 7/00 (2017.01)
(52) U.S. Cl.
  CPC .......... G06T 11/003 (2013.01); G06T 7/0012 (2013.01); G06T 2207/10088 (2013.01);
  (Continued)

(58) Field of Classification Search
  CPC ................. G06T 11/003; G06T 7/0012; G06T 2207/10088; G06T 2207/10116;
  (Continued)

(56) References Cited

U.S. PATENT DOCUMENTS 8,594,405 B2   11/2013  Nakagawa
2002/0072671 A1*  6/2002  Chenal ...................... G06T 7/12
                                                                    600/450
(Continued)

FOREIGN PATENT DOCUMENTS

WO      2014155223 A1    10/2014
WO   WO-2014155223 A1 *  10/2014   ........... A61B 8/0883

OTHER PUBLICATIONS

Benjamin, Emelia J., et al. "Heart disease and stroke statistics—2019 update: a report from the American Heart Association." Circulation 139.10 (2019): e56-e528.
(Continued)

Primary Examiner — Vu Lu
Assistant Examiner — Winta Gebreslassie
(74) Attorney, Agent, or Firm — Lempia Summerfield Katz LLC

(57) ABSTRACT

A method, apparatus, and computer readable storage medium are provided herein for constructing a representation of an annular structure associated with an anatomical object. The method includes receiving three-dimensional image data of the anatomical object and detecting at least a first landmark point and a second landmark point on the annular structure. A plane positioned between the first landmark point and the second landmark point, and oriented in accordance with a predefined angular relationship to a line connecting the first landmark point and the second landmark point is determined. A third landmark point on the annular structure which lies in the plane is also detected and the
(Continued)

representation of the annular structure is generated using at least the first landmark point, the second landmark point, and the third landmark point. The representation is then outputted.

18 Claims, 5 Drawing Sheets

(52) U.S. Cl.
CPC .............. *G06T 2207/10116* (2013.01); *G06T 2207/10132* (2013.01); *G06T 2207/20081* (2013.01); *G06T 2207/30084* (2013.01)

(58) Field of Classification Search
CPC . G06T 2207/10132; G06T 2207/20081; G06T 2207/30084
See application file for complete search history.

(56) References Cited

U.S. PATENT DOCUMENTS

| | | | |
|---|---|---|---|
| 2009/0136109 A1* | 5/2009 | Salgo | A61B 8/0858 600/443 |
| 2016/0314581 A1 | 10/2016 | Contini | |
| 2017/0116497 A1* | 4/2017 | Georgescu | G06N 3/006 |

OTHER PUBLICATIONS

European Search Report for European Application No. 20166104.8-1210 dated Aug. 5, 2020.

Ghesu, Florin-Cristian, et al. "Multi-scale deep reinforcement learning for real-time 3D-landmark detection in CT scans." IEEE transactions on pattern analysis and machine intelligence 41.1 (2017): 1-14.

Ionasec, Razvan Ioan, et al. "Patient-specific modeling and quantification of the aortic and mitral valves from 4-D cardiac CT and TEE." IEEE transactions on medical imaging 29.9 (2010): 1636-1651.

Jégou, Simon, et al. "The one hundred layers tiramisu: Fully convolutional densenets for semantic segmentation." Proceedings of the IEEE conference on computer vision and pattern recognition workshops. 2017. pp. 1-9.

Mnih, Volodymyr, et al. "Human-level control through deep reinforcement learning." nature 518.7540 (2015): 529-533.

Schneider, Robert J., et al. "Mitral annulus segmentation from four-dimensional ultrasound using a valve state predictor and constrained optical flow." Medical image analysis 16.2 (2012): 497-504.

Voigt, Ingmar, et al. "Robust live tracking of mitral valve annulus for minimally-invasive intervention guidance." International Conference on Medical Image Computing and Computer-Assisted Intervention. Springer, Cham, 2015. pp. 1-8.

* cited by examiner

ANNULAR STRUCTURE REPRESENTATION

The present patent document claims the benefit of U.S. Provisional Application No. 62/979,497, filed Feb. 21, 2020, and European Patent Application No. 20166104.8, filed Mar. 27, 2020, which are hereby incorporated by reference in their entireties.

TECHNICAL FIELD

The disclosure relates to processing three-dimensional medical image data to construct a representation of annular structure, in particular, when using a real-time imaging modality.

BACKGROUND

Medical imaging techniques may be used to obtain information regarding a human or animal body. For example, an X-ray image may be used to detect and classify bone fractures. In another example, Magnetic Resonance Imaging (MRI) may be used to image tissues of the body. Similarly, ultrasound imaging may be used to image tissues of the body quickly as well as monitor changes over time.

Image data such as ultrasound image data may be used to detect annular structures associated with anatomical objects such as mitral valves of the heart, or annular structure in other anatomical objects such as the kidneys. Ultrasound imaging enables snapshots of the organ to be taken at a given time, and manual analysis to be performed on the recorded image data in order to detect such anatomical structures.

However, manual detection is time-consuming, and sometimes inaccurate. Techniques may be used to enhance the quality of data used to reconstruct a detected annular structure.

SUMMARY

It is an object of the present disclosure to provide such reconstructions of such annular structures.

The scope of the present disclosure is defined solely by the appended claims and is not affected to any degree by the statements within this summary. The present embodiments may obviate one or more of the drawbacks or limitations in the related art.

According to a first aspect, a method is provided for constructing a representation of an annular structure associated with an anatomical object. The method includes: receiving three-dimensional image data of the anatomical object using an imaging modality; detecting at least a first landmark point and a second landmark point on the annular structure; determining a plane positioned between the first landmark point and the second landmark point and oriented in accordance with a predefined angular relationship to a line connecting the first landmark point and the second landmark point; determining a third landmark point on the annular structure which lies in the plane; generating the representation of the annular structure using at least the first landmark point, the second landmark point, and the third landmark point; and outputting the representation.

Constructing representations of annular structures enables quick and efficient detection of such structures on anatomical objects. Furthermore, constructing the representation in association with three-dimensional image data enables the representation to be presented to a professional, thereby improving the diagnostic information available during a procedure.

The first landmark point and second landmark point may be obtained by applying a landmark detection machine learning algorithm to the three-dimensional image data. Optionally, the landmark detection machine learning algorithm uses a deep reinforcement learning modelling framework trained using a data set including three-dimensional images of annular structures. This enables information associated with the annular structure and substantially similar annular structures, (e.g., from the same anatomical object), to influence the representation constructed by the method.

An estimated three-dimensional location of the annular structure may be determined based on the first landmark point and the second landmark point. This enables further analysis to take place in the likely location of the annular structure, thereby reducing the resources and time required to generate the reconstruction.

Detecting the third landmark point may include: extracting two-dimensional image data from the three-dimensional image data based on the plane; applying a third point detection machine learning algorithm to the two-dimensional image data to determine a two-dimensional location of the third landmark point within the plane; and converting the two-dimensional location of the third landmark point into a three-dimensional third landmark point location using the three-dimensional image data and the plane.

Optionally, revising the estimated three-dimensional location of the annular structure is based on the three-dimensional third landmark point location. This enables other landmarks of the annular structure to be considered thereby improving the accuracy of the reconstruction generated.

Constructing the representation of the annular structure may include: generating a plurality of two-dimensional cutting planes, wherein the two-dimensional cutting planes each bisect the three-dimensional image data; extracting two-dimensional image data extracted from the three-dimensional image data based on the plurality of cutting planes applying a cross-section point detection machine learning algorithm to the extracted two-dimensional image data to determine at least one two-dimensional cross-section point location within the cutting plane; and converting the two-dimensional cross-section point location into a three-dimensional cross-section point location using the three-dimensional image data and the cutting plane. This enables multiple points on the annular structure to be detected which are then used to generate the representation for outputting.

Optionally, constructing the representation of the annular structure may include: detecting a plurality of three-dimensional cross-section point locations; and generating an annular ring representative of the annular structure by interpolating between at least a first three-dimensional cross-section point location, a second three-dimensional cross-section point location, the first landmark point, the second landmark point, and the posterior annular point. This enables multiple points on the annular structure to be detected which are then used to generate the representation for outputting.

At least one of the third landmark point detection machine learning algorithm and the cross-section point detection machine learning algorithm may a two-dimensional deep image to image neural network. This enables efficient processing of the image data because the operations are performed on two-dimensional image data.

The third landmark point detection machine learning algorithm and the cross-section point detection machine learning algorithm may be the same. This enables the same machine learning algorithm to be used, therein reducing the storage required by the data processing system.

Constructing the representation of the annular structure may include: determining a three-dimensional box including at least the first landmark point, the second landmark point, and the third landmark point; applying a three-dimensional densely connected convolutional neural network to perform three-dimensional structure detection within the three-dimensional box to produce a probability map indicative of at least one three-dimensional point location on the annular structure; and analyzing the probability map to generate an annular ring representative of the annular structure. This provides a second method of determining point locations associated with the annular structure without extracting two-dimensional image data.

Optionally, at least one dimension of the three-dimensional box is based on anatomical data associated with the annular structure. This enables different sized boxes to be generated in accordance with the type of anatomical object being analyzed.

The three-dimensional image data may be adjusted based on at least one of the first landmark point, the second landmark point, and the third landmark point. This enables sub-volumes of the three-dimensional image data to be presented to a user via the data processing system.

The predefined angular relationship may be a perpendicular relationship such that the line connecting the first landmark point and the second landmark point is a normal to the plane. This allows the efficient generation of the two-dimensional plane.

The first landmark point and the second landmark point may be positioned on an anterior of the annular structure, and the third landmark point is positioned on a posterior of the annular structure. This enables points in different locations on the annular structure to be determined and a more accurate estimation of the position, size, and orientation of the annular structure to be generated.

The imaging modality may be a real-time imaging modality. This allows the representation of the annular structure to be adjusted over time with reference to separate frames of the image data.

According to a second aspect, an apparatus is provided for constructing a representation of an annular structure associated with an anatomical object. The apparatus includes at least one processor and a memory storing at least one neural network trained to determine point locations associated with the annular structure. The memory includes instructions that, when executed by the at least one processor cause the at least one processor to: receive three-dimensional image data of the anatomical object using an imaging modality; detect at least a first landmark point and a second landmark point on the annular structure using one of the at least one neural network; determine a plane positioned between the first landmark point and the second landmark point and oriented in accordance with a predefined angular relationship to a line connecting the first landmark point and the second landmark point; determine a third landmark point which lies in the plane using one of the at least one neural network; generate the representation of the annular structure using at least the first landmark point, the second landmark point, and the third landmark point; and output the representation.

According to a third aspect, a computer-readable storage medium is provided, wherein the medium includes stored instructions that, when executed by at least one processor cause the at least one processor to: receive three-dimensional image data of the anatomical object using an imaging modality; detect at least a first landmark point and a second landmark point on the annular structure; determine a plane positioned between the first landmark point and the second landmark point and oriented in accordance with a predefined angular relationship to a line connecting the first landmark point and the second landmark point; determine a third landmark point on the annular structure which lies in the plane; generate the representation of the annular structure using at least the first landmark point, the second landmark point, and the third landmark point; and output the representation.

BRIEF DESCRIPTION OF THE DRAWINGS

The above-mentioned attributes, features, and advantages of this disclosure and the manner of achieving them will become more apparent and understandable with the following description of embodiments in conjunction with the accompanying drawings, in which like reference numerals are used to denote like features.

DETAILED DESCRIPTION

Figure 1:
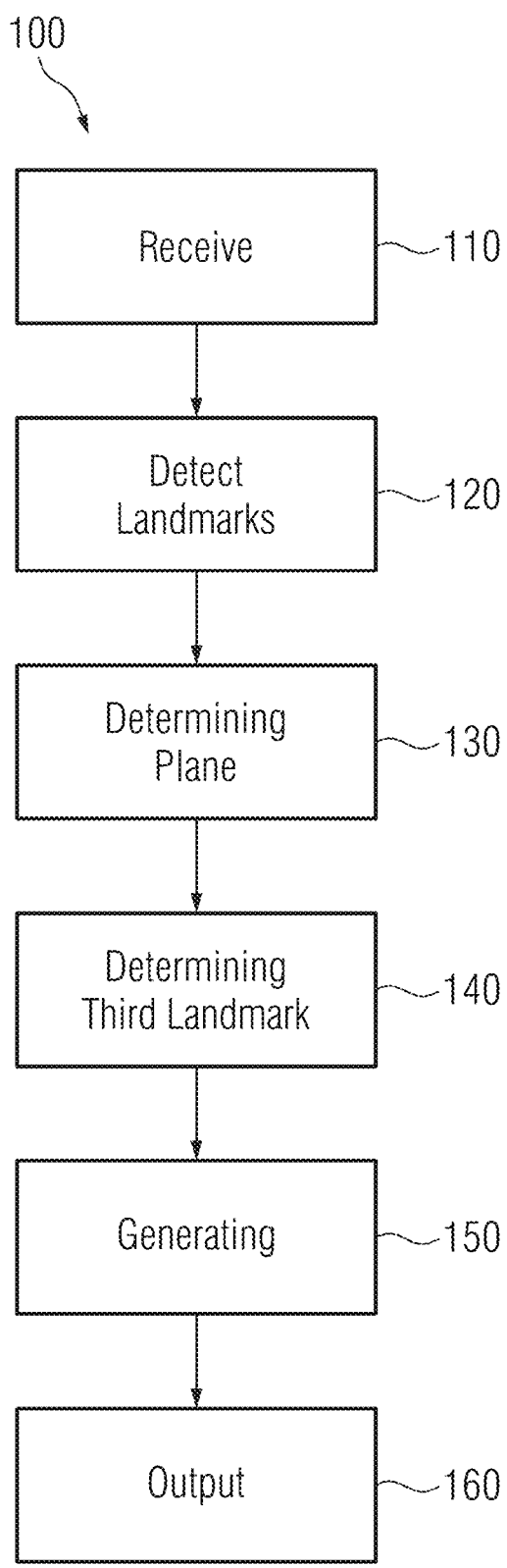
FIG. 1 is a flow diagram illustrating a method for constructing a representation of an annular structure associated with an anatomical object, according to an example.

FIG. 1 is a flow diagram illustrating a computer-implemented method 100 for constructing a representation of an annular structure associated with an anatomical object, such as the heart, and in particular, heart valves. While the disclosure will be described with reference to the construction of representations of annular structures associated with heart valves using transesophageal echocardiography (TEE) imaging, the disclosure equally applies to the construction of annular structures associated with other organs and using other imaging techniques.

At block 110 of method 100, three-dimensional (3D) image data is received at a data processing system. The 3D image data may be 3D medical image data captured using an imaging modality, which may be a real-time imaging modality such as 3D TEE image data, although it will be appreciated that other examples of imaging modalities, real-time or otherwise may be used to capture other types of 3D medical image data. Such types of 3D medical image data include but are not limited to Magnetic Resonance Imaging (MRI) image data, computed tomography scan data, and ultrasound image data. The 3D medical image data may represent an image volume within the human or animal body stored in a 3D format and may be made up of a plurality of voxels.

The 3D medical image data represents an anatomical object within a human or animal body. The anatomical structure contains at least an annular structure, the detection of which may be used to guide tools and equipment for interventional procedures. For example, the 3D medical image data may be 3D TEE image data representing the heart, and the annular structure may be a mitral valve annulus. Annular structures have known properties, (e.g., being substantially circular in shape), allowing certain assumptions to be made when detecting and tracking them for the purposes of guiding such tools.

Following the receipt of the 3D medical image data, at block 120, at least a first and second landmark point are detected on the annular structure represented in the 3D medical image data. When the 3D medical image data represents the mitral valve, the first and second landmark points may be the left and right trigone landmarks, which are located near the anterior annular structure and are identified within 3D TEE image data. In another example, when the 3D medical image data represents the aortic valve, the first and second landmark points may be any two of the three commissural points, which are located between the cusps and may also be identified within 3D TEE image data. It will be appreciated that other landmarks may be used when the medical image data captured represents a different anatomical object. Such landmarks may be determined based on identifiable points of the anatomical object and the imaging modality used.

To detect the location of the first and second landmark point, a landmark detection machine learning algorithm may be applied to the 3D medical image data. In some examples, the landmark detection machine learning algorithm is based on a deep reinforcement learning model which is capable of detecting landmarks on an annular structure of an anatomical object in real-time. An artificial agent associated with the landmark detection machine learning algorithm is arranged to detect the landmarks points and may be trained via a deep reinforcement learning model. Continuing the example described above, the artificial agent may be trained to learn the anatomical structures presented in 3D TEE image data and navigate towards the left or right trigone landmarks.

The deep reinforcement learning model used to train the artificial agent may be represented by the tuple $\{S, A, t, r\}$, wherein:

S is the state of the agent. The state of the agent may correspond to a sub-volume of the 3D medical image data centered at a point p. p represents the current location of the agent within the 3D medical image data.

A is a set of actions to be undertaken by the agent. Because the agent is trained to location landmarks within 3D medical image data, A may represent different displacements along each Cartesian axis, x, y, and z associated with the 3D medical image data.

t is $S \times A \times S \rightarrow [0,1]$ which represents the stochastic transition function, describing the probability of arriving in a given state following a given action. For example, what is the likelihood of arriving at the landmark point if the agent was to move in accordance with an action A.

r is the reward collected by the agent by interacting with the environment. r may be defined as:

$$r = \|p^c - p^{gt}\|_2^2 - \|p^n - p^{gt}\|_2^2$$

In this equation, $p^c$ represents the current location of the agent, $p^{gt}$ is a ground truth location of the landmark it is pursing, and $p^n$ is the next location of the agent after it executes an action. As such, the closer the agent moves towards the target the higher the reward, and if the agent moves away from the target the reward has a negative value.

The agent may be represented by a fully convolutional neural network with a given number of layers, e.g., six fully-convolutional layers. Given a particular 3D path within the 3D medical image data, the network may output six real values corresponding to a Q-value which represents the long-term return of an action. In this example, the Q-value represents an evaluation of the actions in the set of actions A. The maximum Q-value returned indicates the direction to move in the next act. Therefore, provided the agent has been trained on the correct anatomical structures, in order to collect the maximum rewards, the agent moves closer to and then stops at the location of the target landmark. For example, the agent may be trained to detect the left trigone point within 3D TEE image data, as such the agent will move towards the left trigone point within the 3D TEE image data and stop at it as actions are undertaken.

Accordingly, at block 120, agents trained to detect landmark points, such as a left and right trigone point on 3D TEE image data may be used to identify the location of the landmark points. It will be appreciated that a single agent may be used to converge on to the two landmark points, or alternatively, multiple agents used to detect more than two landmark points.

Following the detection of the landmark points, at block 130, a plane is determined. The plane is a two-dimensional (2D) plane extending through the 3D medical image data and positioned based on the location of the landmark points. The plane is not only positioned based on the location of the two landmark points but is also oriented in accordance with a predetermined angular relationship to a line connecting the two landmark points. In the following examples, the predefined angular relationship is a perpendicular relationship such that the line acts as a normal to the plane. Where the predetermined angle is not perpendicular, the predetermined angle will be the acute angle. In such an example, the line connecting the first landmark point and the second landmark point will be rotated by the predetermined angle and then used as a normal to determine the plane. For example, if the coordinates of the first and second landmark points are $(x_1, y_1, z_1)$ and $(x_2, y_2, z_2)$ respectively, any point on the connecting line may be represented by:

$$l = (x_1, y_1, z_1) + t(x_2 - x_1, y_2 - y_1, z_2 - z_1)$$

where $t \in [0,1]$. The predetermined angle in the 3D space may be represented by $(\alpha, \beta, \gamma)$, where $\alpha$, $\beta$, and $\gamma$ represent the yaw, pitch and roll angles. The rotated line may then be computed by multiplying the rotation matrix corresponding to each angle:

$$l' = R(\gamma) R(\beta) R(\alpha) l$$

where:

$$R(\alpha) = \begin{pmatrix} 1 & 0 & 0 \\ 0 & \cos\alpha & -\sin\alpha \\ 0 & \sin\alpha & \cos\alpha \end{pmatrix}$$

$$R(\beta) = \begin{pmatrix} \cos\beta & 0 & \sin\beta \\ 0 & 1 & 0 \\ -\sin\beta & 0 & \cos\beta \end{pmatrix}$$

$$R(\gamma) = \begin{pmatrix} \cos\gamma & -\sin\gamma & 0 \\ \sin\gamma & \cos\gamma & 0 \\ 0 & 0 & 1 \end{pmatrix}$$

For example, where the landmark points are the left and right trigone points on a mitral valve annulus, the plane is a 2D septo-lateral plane, which uses a connection between the left trigone point and the right trigone point as the plane normal. Due to the cyclic nature of annular structures, both an anterior and posterior landmark points will be within the plane, because the 2D plane extends across a section of the heart represented in the 3D TEE image.

As such, at block 140, a third landmark point location of the annular structure is detected. The determination of the third landmark point location may be performed using, for example, machine learning methodologies, as will be described below with reference to FIG. 2, or other image recognition methodologies. It will be appreciated that the method of determining the third landmark point location selected may be selected based on the medical image data used, the anatomical object represented in the medical image data, and/or characteristics associated with the annular structure.

In the following examples, in which the predefined angular relationship mentioned above is a perpendicular relationship, the third landmark point is a posterior mid-point on the annular structure. Accordingly, the first and second landmark points will be present on the anterior of the annular structure and the third landmark point will be present on the posterior of the annular structure.

The third landmark point location determined in the plane may be used to generate the representation of the annular structure at block 150. Based on the determined locations of the landmark points and third landmark point, an estimation of the location and orientation of the annular structure in a 3D space may be determined. The estimated location and orientation may then be refined by, for example, methodologies as will be described in further detail below with reference to FIGS. 3A and 3B.

Following the generation of the representation of the annular structure, at block 160, the representation is output to a device, such as a display or other computing device enabling a user of the data processing system to view and further analyze the representation and use the information presented to guide other tools and/or equipment in a procedure.

In an alternative example, following the determination of the third landmark point location, the landmark locations detected at block 120 and the third landmark point location may be used to construct a view selection box representative of a view to be output to a device of the data processing system. Constructing a view selection box enables the data processing system to output only the 3D medical image data relevant to the user at a given time. The size of the view selection box may be based, not only on the landmark and third landmark point locations but, on prior anatomical/clinical knowledge about the anatomical object which is represented in the 3D medical image data.

Figure 2:
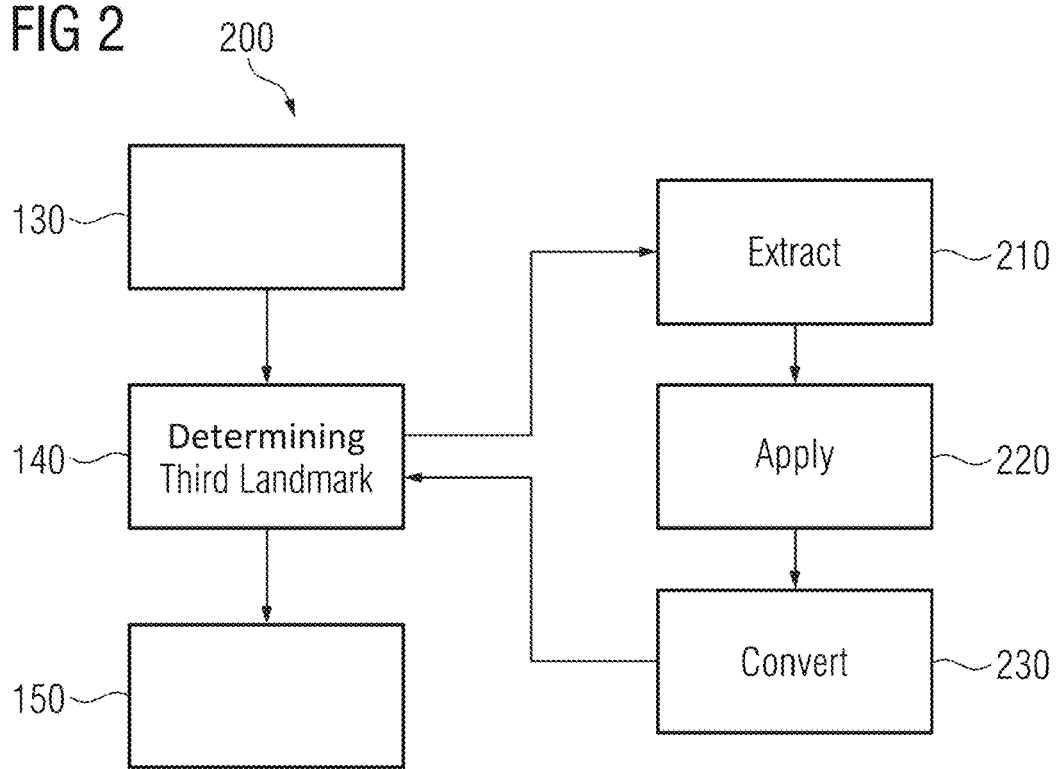
FIG. 2 is a flow diagram illustrating a method for determining a third landmark point associated with the annular structure, according to the example.

FIG. 2 is a flow diagram illustrating a method 200 for determining a third landmark point associated with the annular structure, according to the example. The method 200 for determining the third landmark point may form part of the detect third landmark point block 140 described above in relation to FIG. 1. As described in relation to block 140, the determination of a third landmark point includes receiving a 2D plane located and oriented in accordance with previously detected landmarks, and 3D medical image data. For example, the determination of the third landmark point may be based on the orientation and location of a 2D sept-lateral plane and 3D TEE image data.

To determine the third landmark point, at block 210, 2D image data is extracted from the 3D medical image data, based on the 2D plane. For example, the 2D image data may represent an area of a cross-section of the 3D medical image data. Reduction of the dimensions of the image data from 3D to 2D facilitates detection of prominent features shown in the 2D image data using a trained machine learning algorithm, because training of the algorithm operating in 2D space may be efficient and accurate.

To determine the third landmark point in the extracted 2D image data, a machine learning algorithm, (e.g., a third landmark point detection machine learning algorithm), is applied to the extracted 2D image data at block 220. The third landmark point detection machine learning algorithm may be a 2D deep image-to-image network for determining landmarks in 2D image data. The 2D deep image-to-image network may be a convolutional neural network, such as U-Net. As such, the 2D deep image-to-image network may be a multi-layer fully convolutional network which uses an encoder-decoder U-Net structure with densely connected convolutional blocks and skip connections. It will be appreciated that other types of neural network may be used.

The 2D deep image-to-image network may have a ground truth represented as a binary matrix where there a value of '1' is at the third landmark point location and a value of '0' is elsewhere. During the training process, the ground truth matrix may be augmented to generate a continuous 2D Gaussian map G, which has '1' at its peak value and gradually decays to '0' as the distance between the pixel in the 2D image data and the third landmark point location increases. Accordingly, if a ground truth location of a third landmark point location is at $(x^{gt}, y^{gt})$ on the plane, the value of an entry (i, j) in the binary matrix is:

$$G(i, j) = \exp\left\{\frac{(i - x^{gt})^2 + (j - y^{gt})^2}{\sigma^2}\right\}$$

In this equation, $\sigma$ is defined empirically to achieve the best detection performance. An $L^2$ loss term is used between a predicted probability map produced by the 2D deep image-to-image network and the 2D Gaussian map. Using this information, thresholding or clustering methods may be used to determine a target third landmark point location in the 2D image data associated with the 2D plane.

Following the extraction of the third landmark point location in the 2D image data, at block 230, the location is converted from a 2D location to a 3D location based on the known location of the 2D plane is associated with the 3D medical image data. The 3D location is then provided to the generation act 150 of method 100 described above in relation to FIG. 1, and below in relation to FIGS. 3A and 3B.

An example of the third landmark point detection method will now be described in accordance with the example set out above. Following the extraction of the 2D septo-lateral plane, image data may be extracted from the 3D TEE image data. Therefore, 2D image data representing a cross-section of the 3D TEE image data at the location of the 2D septo-lateral plane is obtained. A 2D deep image-to-image network trained to determine the third landmark point of annular structure with the heart, such as a mitral valve annulus, is then applied to the extracted 2D image data. Once the location of the third landmark point within the 2D image data has been obtained, the 2D location extracted is converted into a 3D location based on the 2D location and the position of the 2D septo-lateral plane within the 3D TEE image data.

Generating a representation of an annular structure based on the first and second landmark point locations and determined third landmark point may be undertaken using a multi-point detection method or a 3D thin box detection method. Examples of these methods will be described below with reference to FIGS. 3A and 3B, respectively. However, it will be appreciated that other methods of generating a representation of an annular structure may be used.

Figure 3:
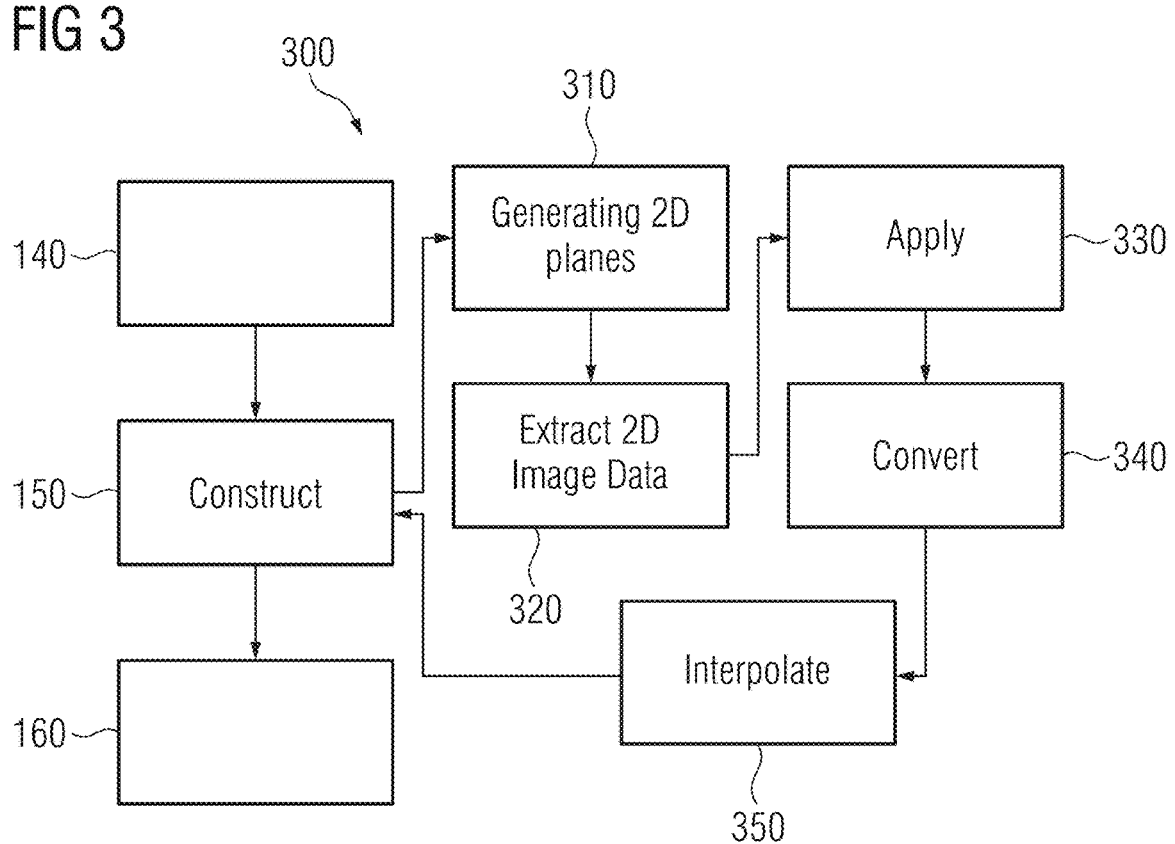
FIG. 3 is a flow diagram illustrating the method act of constructing a representation of the annular structure, according to a first example.

FIG. 3 is a flow diagram illustrating the method act 150 of constructing a representation of the annular structure, according to a first example. The flow diagram represents a method of constructing the representation using a multi-point detection method 300. At block 310, a plurality of 2D cutting planes are determined. Similar to the 2D plane determined at block 140 to determine the third landmark point and as described in detail above in relation to FIG. 2, the 2D cutting planes are positioned and oriented such that there are a number of cross-section points on the annular structure within each plane.

The 2D cutting planes may be based on the determined landmarks and the 2D plane determined at block 140. For example, the 2D cutting planes may be defined by rotating the normal of the 2D plane, which may be based on a connection between a first landmark point and a second landmark point, around a given unit vector, u. In such an example, where the unit vector u=($U_x$, $u_y$, $u_z$) which in turn is equal to (L→R)×$\vec{z}$, where $\vec{z}$=(0,0,1), a matrix, R, representing the rotation of a normal to determine multiple 2D cutting planes may be derived:

$$R = \begin{bmatrix} \cos\theta + u_x^2(1-\cos\theta) & u_x u_y(1-\cos\theta) - u_z\sin\theta & u_x u_y(1-\cos\theta) + u_z\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) + u_y\sin\theta & u_z u_y(1-\cos\theta) + u_x\sin\theta & \cos\theta + u_z^2(1-\cos\theta) \end{bmatrix}$$

The 2D cutting planes may then be determined at angle θ, for example, an optimal multi-cut strategy may determine 2D cutting planes at −30, 30, and 90 degrees. It will be appreciated that any number of 2D cutting planes may be determine, and the number and orientation of the cutting planes may be dependent upon characteristics of the annular structure and/or the anatomical object. Furthermore, the matrix, R, may vary depending on the plane determined as well as characteristics of the annular structure and/or anatomical object.

Following the generation of the 2D cutting planes, at block 320, 2D image data is extracted from the 3D medical image data in accordance with the position and the orientation of the 2D cutting planes.

At block 330, a cross-section point detection machine learning algorithm is applied to the 2D image data extracted from the 3D medical image data in accordance with the 2D cutting planes. As described above with reference to FIG. 2, applying such an algorithm enables points on the annular structure to be determined. The algorithm uses a 2D deep image-to-image network may be a convolutional neural network, such as U-Net. As such, deep image-to-image network may be a multi-layer fully convolutional network which uses an encoder-decoder U-Net structure with densely connected convolutional blocks and skip connections. It will be appreciated that other types of neural network may be used.

The 2D deep image-to-image network may have a ground truth represented as a binary matrix where there a value of '1' is at the cross-section point location on the annular structure, and a value of '0' is elsewhere. The cross-section point locations need not be the location of the third landmark point but may be other points on the annular structure. During the training process, a ground truth matrix may be augmented to generate a continuous 2D Gaussian map G, which has '1' at its peak value and gradually decays to '0' as the distance between the pixel in the 2D image data and the cross-section point increases. Accordingly, if a ground truth location of a cross-section point location is at ($x^{gt}$, $y^{gt}$) on the cutting plane, the value of an entry (i, j) in the binary matrix is:

$$G(i, j) = \exp\left\{\frac{(i - x^{gt})^2 + (j - y^{gt})^2}{\sigma^2}\right\}$$

In this equation, σ is defined empirically to achieve the best detection performance. An $L^2$ loss term is used between a predicted probability map produced by the 2D deep image-to-image network and the 2D Gaussian map. Using this information, thresholding or clustering methods may be used to determine a target location in the 2D image data associated with the 2D cutting plane. It will be appreciated that whilst the determination of one or more cross-section points on the annular structure may be undertaken sequentially, that is a first 2D cutting plane is processed, followed by a second cutting plane, and so on, the determination of one or more cross-section points may also be undertaken in parallel by applying the cross-section point detection algorithm to multiple 2D cutting planes substantially simultaneously. Furthermore, whilst in the above example the machine learning algorithm used to determine the third landmark point location and individual cross-section point locations is substantially similar, it will be appreciated that different algorithms and/or methodologies may be used.

Once 2D cross-section point locations have been identified, at block 340, the 2D cross-section point locations are converted into 3D cross-section point locations using the known location and orientation of the 2D cutting planes.

Once a plurality of 3D locations have been obtained, which include the landmark points determined at block 120 of method 100 and the third landmark point determined at block 140 and the cross-section point locations determined at blocks 310-340, at block 350, a representation of an annulus ring of the annular structure is generated by interpolating between the 3D locations. This representation is then forwarded to block 160 of method 100 for output to a device of the data processing system.

By using multiple 2D cutting planes, and a machine learning algorithm trained on 2D data and to extract 2D landmark locations, the method 300 is efficient and reduces the processing power required because only 2D operations are being executed.

Figure 4:
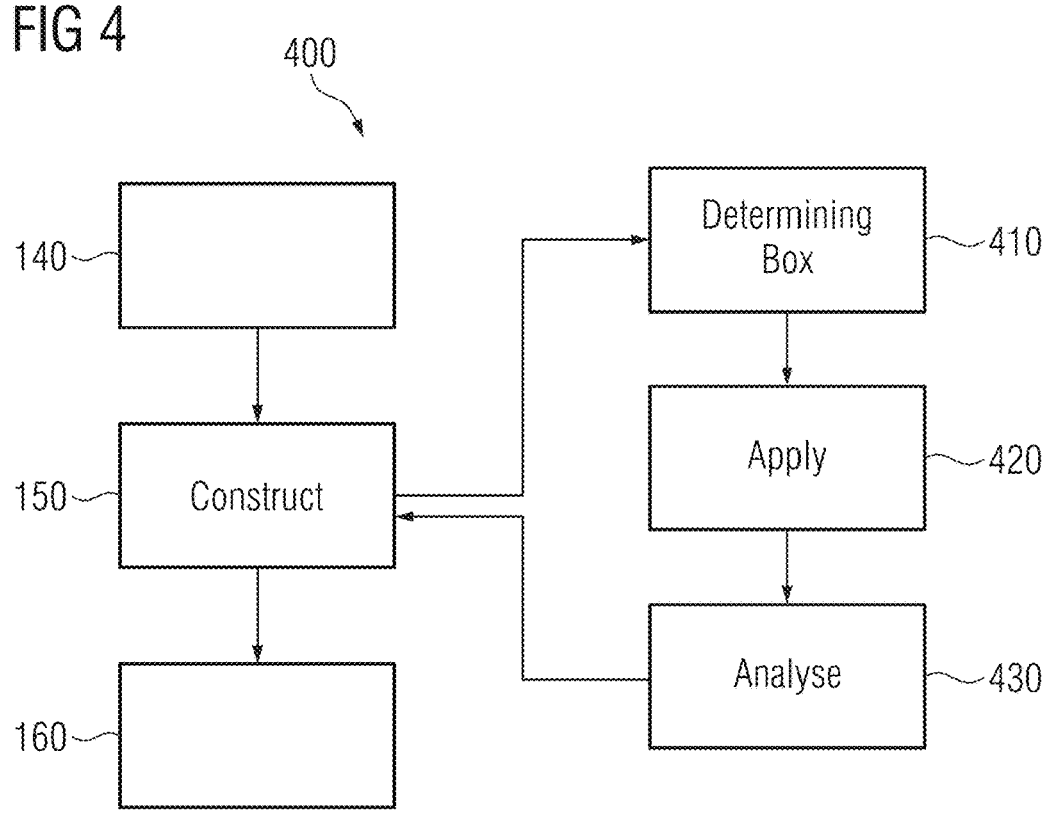
FIG. 4 is a flow diagram illustrating the method act of constructing the representation of the annular structure, according to a second example.

An alternative method of generating a representation of an annulus ring of an annular structure will now be described with reference to FIG. 4. FIG. 4 is a flow diagram illustrating the method act 150 of generating a representation of the annular structure, according to a second example. The flow diagram represents a method of generating the representation using a thin box detection method 400. Instead of extracting 2D image data using a plurality of 2D cutting planes as described above, a 3D box sub-volume is used cutting through the 3D image data. At block 410, a 3D box is generated which contains the landmark points, and third landmark point determined at block 120 and block 140 of method 100. In addition to being sized so as to contain the location of the determined points, the dimensions of the 3D box may also be sized in accordance with prior anatomical/clinical knowledge. For example, where it is known that the annular structure is a mitral valve annulus, anatomical/clinical knowledge regarding the size of a mitral valve is used to determine the size of the box.

Following the generation of the box, at block 420, a 3D densely connected neural network is applied to the image data within the sub-volume defined by the box. The 3D densely connected neural network may be a 3D image-to-image network which is trained to segment an annular structure from the sub-volume defined by the box. The training of the 3D image-to-image neural network may include extending a densely-connected U-Net with 3D convolutions to enable it to perform 3D structure detection. The 3D image-to-image network is arranged to produce a 3D probability map indicating the locations of the points on the annular structure. The 3D Gaussian map G' may be constructed from a ground truth 3D binary mask. The 3D Gaussian map G', has '1' at its peak value and gradually decays to '0' as the distance between the voxel in the 3D image data and the landmark location increases. Accordingly, if a ground truth location of a landmark location is at $(x^{gt}, y^{gt}, z^{gt})$ within the sub-volume, the value of an entry (i, j, k) in the binary matrix is:

$$G'(i, j, k) = \sum_{(x^{gt}, y^{gt}, z^{gt}) \in Ann} \exp\left\{\frac{(i - x^{gt})^2 + (j - y^{gt})^2 + (k - z^{gt})^2}{\delta^2}\right\}$$

Where Ann is the point set of the ground truth annulus notation, and $\delta$ is empirically defined to achieve the best detection performance in 3D.

Following the determination of a plurality of points within the 3D sub-volume defined by the box, at block 430, the points are analyzed and a representation of an annulus ring of the annular structure is generated by interpolating between the 3D landmark locations. This representation is then forwarded to block 160 of method 100 for output to a device of the data processing system.

By defining a box representing a sub-volume of the 3D medical image data the 3D image-to-image model is not required to analyze the entirety of the 3D medical image data to generate the representation. Instead, efficiency is improved by only applying the 3D image-to-image model to the 3D medical image data within the sub-volume.

Figure 5:
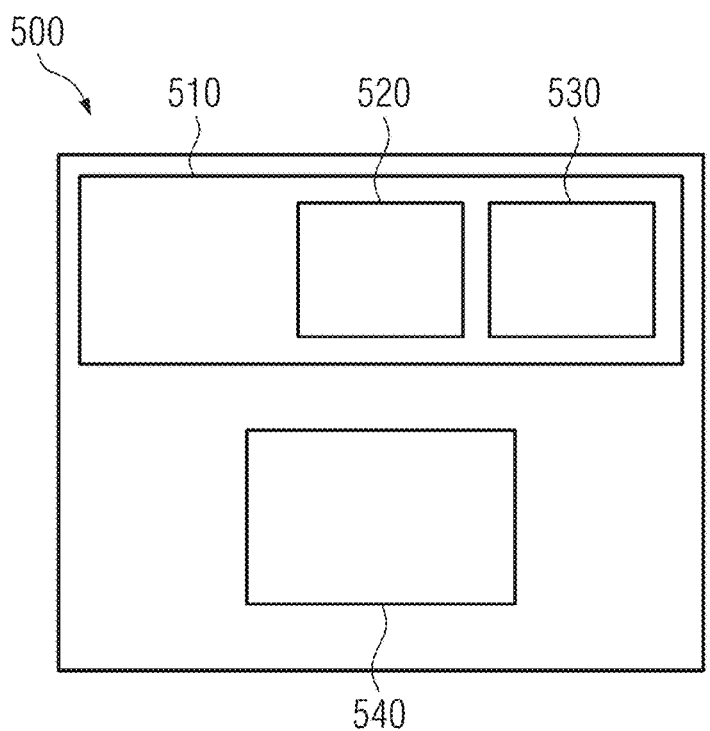
FIG. 5 is a schematic representation of an apparatus for constructing a representation of an annular structure, according to an example.

FIG. 5 schematically illustrates an apparatus 500 for generating annular structure representations using method 100 described above in relation to FIG. 1. The apparatus 500 includes a computing device in the form of a computer 510. The computer 510 includes one or more processors 520 and a memory 530. The memory 506 may be in the form of a computer-readable storage medium. The memory may include a main memory, otherwise referred to as a 'primary memory'. The memory may be an external memory, in that the memory is external to the apparatus. For example, the memory may include 'off-chip' memory. The memory may have a greater storage capacity than the memory cache(s) of the processor 520. In some examples, the memory is included in the data processing system. For example, the memory may include 'on-chip' memory and be packaged alongside the processor 520 in a single 'system on a chip'.

The memory 530 may include a magnetic or optical disk and disk drive or a solid-state drive (SSD). In some examples, the memory includes a synchronous dynamic random-access memory (SDRAM). For example, the memory may include a double data rate synchronous dynamic random-access memory (DDR-SDRAM). The memory 530 has stored on it one or more neural networks trained to determine point locations for an annular structure representation associated with an anatomical object shown in the three-dimensional image data. For example, the memory 530 may have the neural networks described above stored on it. The memory 530 may also store instructions that when executed by the one or more processors 520, cause the one or more processors to perform the representation construction method described above.

The processor 520 may include multiple processing units, such as image signal processors (ISP), graphics processing units (GPU), general-purpose central processing units (CPU), or neural processing units (NPU). Furthermore, the processor 404 may exist alongside other components such as memory 406 used for storing instructions and/or data associated with the task generating representations of annular structures. The use of such processors may optimize the apparatus 500 for making use of the described neural networks. This is because, as will be appreciated, such processors may make use of multi-thread processing and handle a large number of threads at the same time.

The one or more neural networks and the instructions may be stored on the memory 530 when the apparatus 500 is supplied to a user. Alternatively, the one or more neural networks and the instructions may be supplied thereafter (e.g., in the form of a computer program product) by a computer-readable storage medium such as a compact disk (CD), a digital versatile disk (DVD), hard disk drive, solid-state drive, a flash memory device and the like. Alternatively, the one or more neural networks and the instructions may be downloaded onto the storage medium 430 via a data communication network (e.g., the Internet).

In some examples, the apparatus 500 may also include an imaging apparatus 540 configured to acquire the medical image data, (e.g., TEE imaging apparatus, an ultrasound probe, or MRI imaging apparatus). As such, the apparatus 500 may include a TEE image acquisition machine, an MRI image acquisition machine, or ultrasound image acquisition machine as well as the computer 510.

In some examples, the apparatus 500 may include an input interface such as a mouse, a keyboard (or respective connection interfaces for connecting same), a touch screen interface, and the like. A user of the apparatus 500 may use the input interface to input information into the apparatus 500. For example, the user may manually correct and/or override the output of the apparatus 500.

The components 510, 520, 530, 540 of the apparatus may be interconnected with other components of the apparatus, such as the sensor used to capture the medical image data, (e.g., using system bus), although it will be appreciated that one component may be directly connected to one another component such that the output of a first component is connected directly to the input of a second component in a pipeline. This allows data to be transferred between the various components efficiently without the need to first store the output of the first component.

Figure 6:
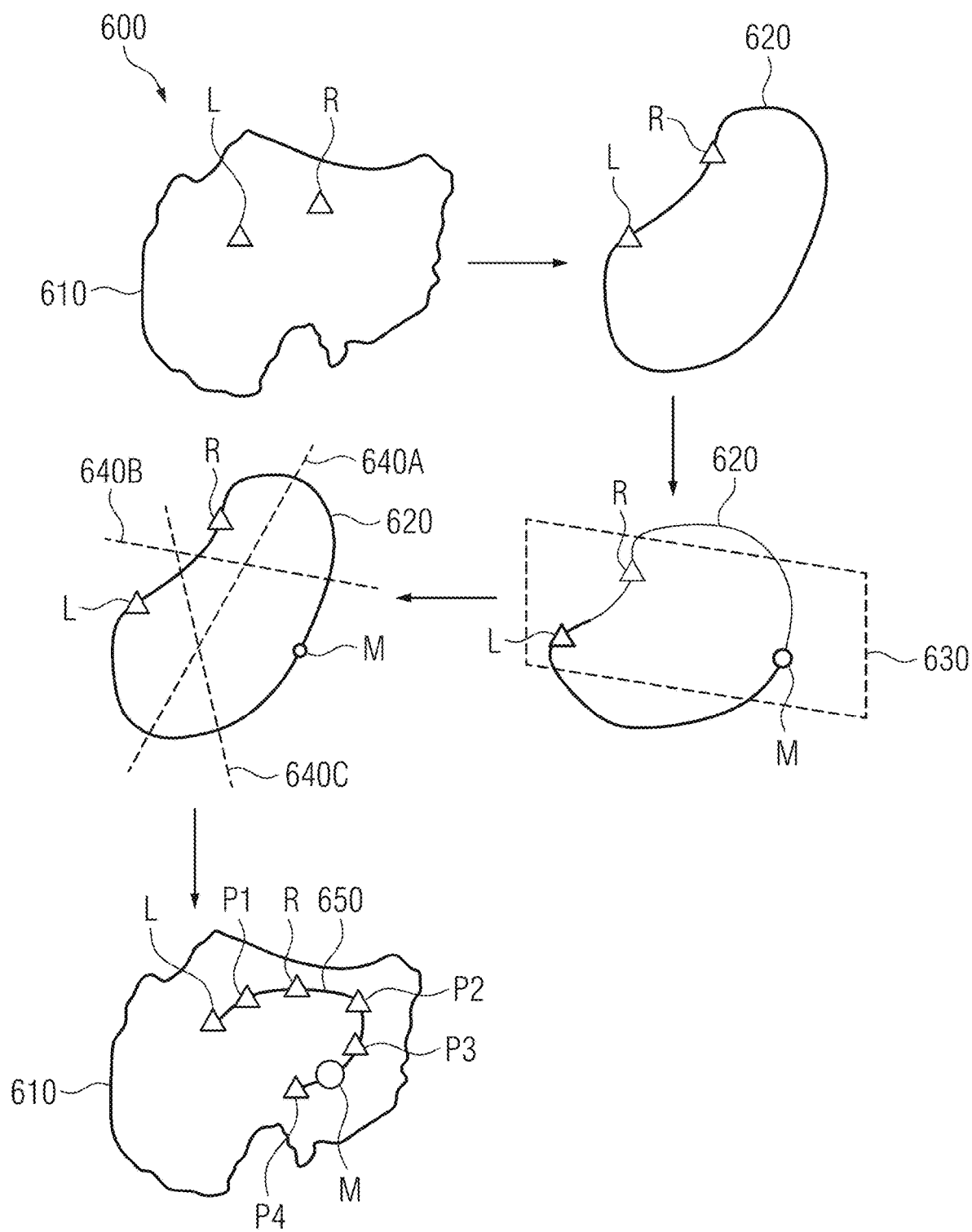
FIG. 6 depicts the construction of a representation of an annular structure on a medical image according to the first example.

FIG. 6 depicts the generation of a representation 650 of an annular structure on a medical image 610 using the 2D cutting planes method 300 described above with reference to FIG. 3. 3D medical image data 610 is received, e.g., 3D TEE image data of a mitral valve, as shown in the example. A left trigone landmark L and right trigone landmark R are determined in the 3D TEE image data using a landmark detection machine learning algorithm is a based on a deep reinforcement learning model, as described above with reference to block 120 of method 100.

Based on the left trigone landmark L and right trigone landmark R, an estimate 620 of the size and orientation of the annular structure may be determined. A 2D plane 630, representing a 2D septo-lateral plane, is then used to extract sectional 2D image data from the 3D TEE image data. The 2D plane is positioned between the left trigone landmark L and the right trigone landmark R and oriented such that a connection between the left trigone landmark R and right trigone landmark R is a normal to the 2D plane 630.

Using a third landmark point detection machine learning algorithm, such as the 2D image-to-image machine learning algorithm described above with reference to FIG. 2, a third landmark point M is determined which lies on the annular structure.

Following the determination of the left trigone landmark L, right trigone landmark R, and third landmark point M, a plurality of 2D cutting planes 640A, 640B, 640C are extracted from the 3D TEE data. The 2D cutting planes 640A, 640B, 640C are used to extract 2D section image data from the 3D TEE image data and cross-section point detection machine learning algorithm is applied to the 2D image data to determine 2D locations on the annular structure. The determined 2D locations are then converted into 3D point locations P1, P2, P3, P4 representing the locations in the 3D TEE image which define the annular structure. A representation 650 of the annular structure may then be generated by interpolating between the 3D point locations P1, P2, P3, P4.

Figure 7:
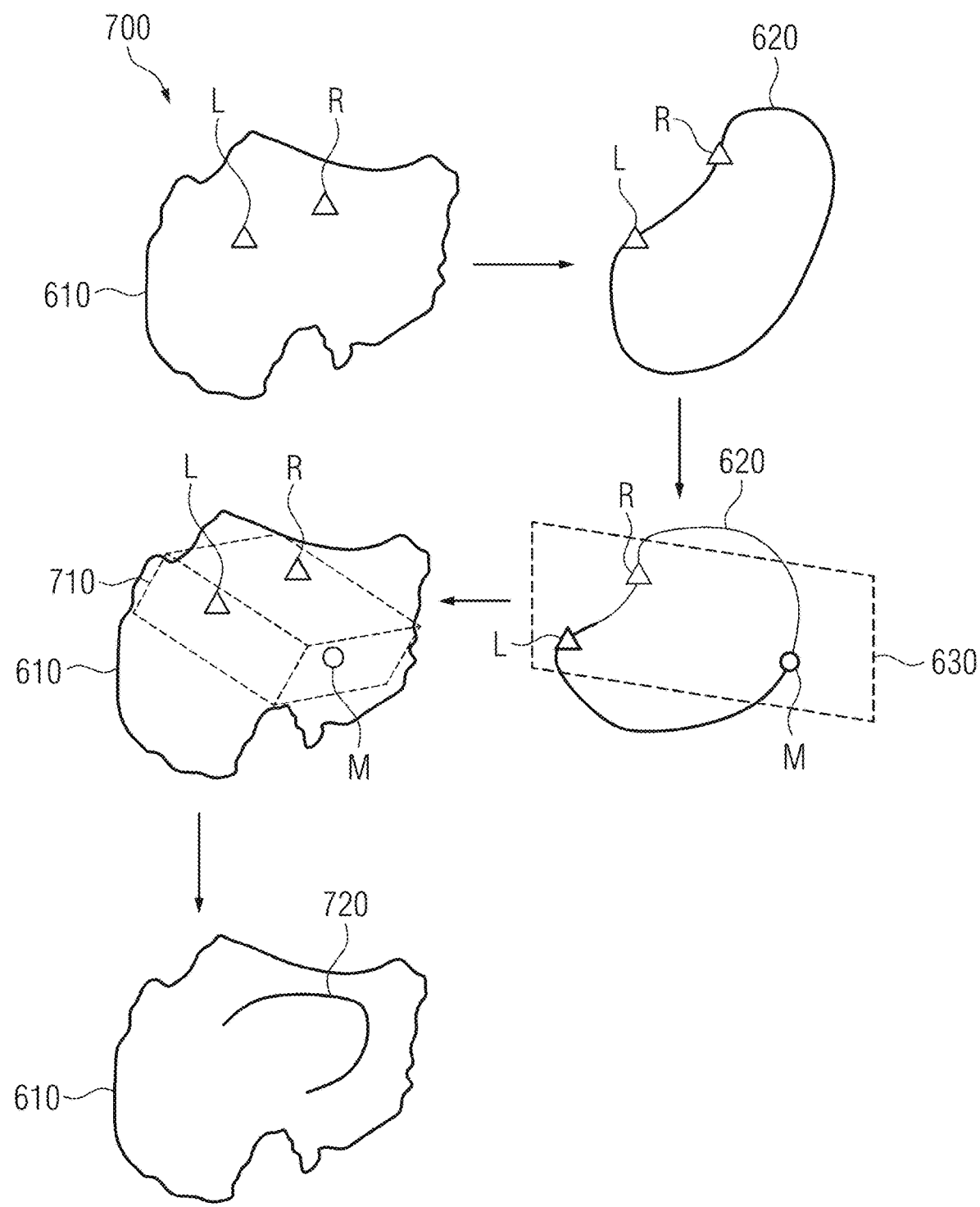
FIG. 7 depicts the construction of a representation of an annular structure on a medical image according to the second example.

FIG. 7 depicts the generation of a representation 720 of an annular structure on a medical image 610 using the 3D thin box detection method 400 described above with reference to FIG. 4. 3D medical image data 610 is received, in the example shown this is 3D TEE image data of a mitral valve. A left trigone landmark L and right trigone landmark R are determined in the image data using a landmark detection machine learning algorithm is a based on a deep reinforcement learning model, as described above with reference to block 120 of method 100.

Based on the left trigone landmark L and right trigone landmark R, an estimate 620 of the size and orientation of the annular structure may be determined. A 2D plane 630, representing a 2D septo-lateral plane, is then used to extract sectional 2D image data from the 3D TEE image data. The 2D plane is positioned between the left trigone landmark L and the right trigone landmark R and oriented such that a connection between the left trigone landmark R and right trigone landmark R is a normal to the 2D plane 630.

Using a third landmark point detection machine learning algorithm, such as the 2D image-to-image machine learning algorithm described above with reference to FIG. 2, a third landmark point M is determined which lies on the annular structure.

Following the detection of the left trigone landmark L, right trigone landmark R, and determination of the third landmark point M, a box 710 is generated based on the 3D landmark L, R and third landmark point M locations detected and anatomical knowledge associated with the annular structure, and/or the anatomical object represented in the 3D TEE image data. In this case, knowledge regarding mitral valves will be used to define the size of the box. Following the generation of the box 710, a 3D densely connected neural network is applied to the 3D TEE image data within the sub-volume defined by the box 710. The 3D densely connected neural network may be a 3D image-to-image network which is trained to segment an annular structure from the sub-volume defined by the box 710.

The 3D image-to-image network is arranged to produce a 3D probability map indicating the locations of the points on the annular structure. The probability map is then used to generate a representation 720 of the annular structure for output to a device associated with a data processing system.

This disclosure may be used in a number of circumstances, including in order to provide an indication and guide for the positioning of medical devices, in and through the annular structure. For example, 3D TEE image data captured in real time may be analyzed to indicate the location of an annular structure such as a mitral valve annulus. This indication may then be provided to a user on a display of the data processing system such that they are able to guide an ultrasound probe through the mitral valve and into the structure of the heart.

In summary, disclosed is a method, apparatus, and computer readable storage medium for constructing a representation of an annular structure associated with an anatomical object. The method includes receiving three-dimensional image data of the anatomical object; and detecting at least a first landmark point and a second landmark point on the annular structure. A plane positioned between the first landmark point and the second landmark point, and oriented in accordance with a predefined angular relationship to a line connecting the first landmark point and the second landmark point is determined. A third landmark point on the annular structure which lies in the plane is also detected and the representation of the annular structure is generated using at least the first landmark point, the second landmark point, and the third landmark point. The representation is then outputted.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described in detail with reference to the exemplary embodiments, it is not limited by the disclosed examples and a person skilled in the art may derive other variations herefrom without departing from the scope of the disclosure.

The invention claimed is:

1. A method for constructing a representation of an annular structure associated with an anatomical object, the method comprising:
receiving three-dimensional image data of the anatomical object;
detecting a first landmark point and a second landmark point on the annular structure;
determining a plane positioned between the first landmark point and the second landmark point and oriented in accordance with a predefined angular relationship to a line connecting the first landmark point and the second landmark point;
subsequently determining a third landmark point on the annular structure that lies in the determined plane;
generating the representation of the annular structure using at least the first landmark point, the second landmark point, and the third landmark point, wherein the generating comprises: (1) determining a three-dimensional box comprising at least the first landmark point, the second landmark point, and the third landmark point; (2) performing a three-dimensional structure detection within the three-dimensional box to produce a probability map indicative of at least one three-dimensional point location on the annular structure; and (3) analyzing the probability map to generate an annular ring representative of the annular structure; and outputting the representation.

2. The method of claim 1, where the first landmark point and the second landmark point are obtained by applying a landmark detection machine learning algorithm to the three-dimensional image data.

3. The method of claim 2, wherein the landmark detection machine learning algorithm uses a deep reinforcement learning modelling framework trained using a data set comprising three-dimensional images of annular structures.

4. The method of claim 1, further comprising:
determining an estimated three-dimensional location of the annular structure based on the first landmark point and the second landmark point.

5. The method of claim 1, wherein the determining of the third landmark point comprises:
extracting two-dimensional image data from the three-dimensional image data based on the plane;
applying a third landmark point detection machine learning algorithm to the two-dimensional image data to determine a two-dimensional location of the third landmark point within the plane; and
converting the two-dimensional location of the third landmark point into a three-dimensional third landmark point location using the three-dimensional image data and the plane.

6. The method of claim 5, further comprising:
determining an estimated three-dimensional location of the annular structure based on the first landmark point and the second landmark point; and
revising the estimated three-dimensional location of the annular structure based on the three-dimensional third landmark point location.

7. The method of claim 5, wherein the generating of the representation of the annular structure further comprises:
generating a plurality of two-dimensional cutting planes, wherein the two-dimensional cutting planes each bisect the three-dimensional image data;
extracting the two-dimensional image data from the three-dimensional image data based on the plurality of cutting planes;
applying a cross-section point detection machine learning algorithm to the extracted two-dimensional image data to determine at least one two-dimensional cross-section point location within a cutting plane of the plurality of cutting planes; and
converting the two-dimensional cross-section point location into a three-dimensional cross-section point location using the three-dimensional image data and the cutting plane.

8. The method of claim 7, wherein the generating of the representation of the annular structure further comprises:
detecting a plurality of three-dimensional cross-section point locations; and
generating an annular ring representative of the annular structure by interpolating between at least a first three-dimensional cross-section point location, a second three-dimensional cross-section point location, the first landmark point, the second landmark point, and the third landmark point.

9. The method of claim 7, wherein at least one of the third landmark point detection machine learning algorithm and the cross-section point detection machine learning algorithm is a two-dimensional deep image to image neural network.

10. The method of claim 7, wherein the third landmark point detection machine learning algorithm and the cross-section point detection machine learning algorithm are the same.

11. The method of claim 1, wherein the generating of the representation of the annular structure further comprises:
applying a three-dimensional densely connected neural network to perform the three-dimensional structure detection.

12. The method of claim 11, wherein at least one dimension of the three-dimensional box is based on anatomical data associated with the annular structure.

13. The method of claim 1, further comprising:
adjusting the three-dimensional image data based on at least one of the first landmark point, the second landmark point, and the third landmark point.

14. The method of claim 1, wherein the predefined angular relationship is a perpendicular relationship such that the line connecting the first landmark point and the second landmark point is a normal to the plane.

15. The method of claim 1, wherein the first landmark point and the second landmark point are positioned on an anterior of the annular structure, and the third landmark point is positioned on a posterior of the annular structure.

16. The method of claim 1, wherein the three-dimensional image data is captured using a real-time imaging modality.

17. An apparatus for constructing a representation of an annular structure associated with an anatomical object, the apparatus comprising:
at least one processor; and
a memory storing:
at least one neural network trained to determine point locations associated with the annular structure; and
instructions that, when executed by the at least one processor cause the at least one processor to:
receive three-dimensional image data of the anatomical object;
detect a first landmark point and a second landmark point on the annular structure using one of the at least one neural network;
determine a plane positioned between the first landmark point and the second landmark point and oriented in accordance with a predefined angular relationship to a line connecting the first landmark point and the second landmark point;
subsequently determine a third landmark point that lies in the determined plane using one of the at least one neural network;
generate the representation of the annular structure using at least the first landmark point, the second landmark point, and the third landmark point, wherein the generation comprises: (1) determining a three-dimensional box comprising at least the first landmark point, the second landmark point, and the third landmark point; (2) performing a three-dimensional structure detection within the three-dimensional box to produce a probability map indicative of at least one three-dimensional point location on the annular structure; and (3)

analyzing the probability map to generate an annular ring representative of the annular structure; and
output the representation.

18. A computer-readable storage medium storing instructions that, when executed by at least one processor, cause the at least one processor to:
receive three-dimensional image data of an anatomical object;
detect a first landmark point and a second landmark point on an annular structure;
determine a plane positioned between the first landmark point and the second landmark point and oriented in accordance with a predefined angular relationship to a line connecting the first landmark point and the second landmark point;
subsequently determine a third landmark point on the annular structure that lies in the determined plane;
generate a representation of the annular structure using at least the first landmark point, the second landmark point, and the third landmark point, wherein the generation comprises: (1) determining a three-dimensional box comprising at least the first landmark point the second landmark point, and the third landmark point: (2) performing a three-dimensional structure detection within the three-dimensional box to produce a probability map indicative of at least one three-dimensional point location on the annular structure; and (3) analyzing the probability map to generate an annular ring representative of the annular structure; and
output the representation.

* * * * *